(12) United States Patent
Park et al.

(10) Patent No.: US 8,643,265 B2
(45) Date of Patent: Feb. 4, 2014

(54) BACKLIGHT ASSEMBLY AND DISPLAY APPARATUS HAVING THE SAME

(75) Inventors: Haeil Park, Seoul (KR); Jinseob Byun, Seoul (KR); Gunwoo Kim, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 335 days.

(21) Appl. No.: 13/106,495

(22) Filed: May 12, 2011

(65) Prior Publication Data

US 2011/0279754 A1   Nov. 17, 2011

(30) Foreign Application Priority Data

May 13, 2010   (KR) .......................... 10-2010-0045085

(51) Int. Cl.
*H05B 33/00* (2006.01)
*H01J 1/30* (2006.01)

(52) U.S. Cl.
USPC ........... 313/498; 313/112; 313/113; 313/116; 313/495

(58) Field of Classification Search
None
See application file for complete search history.

(56) References Cited

U.S. PATENT DOCUMENTS

| 7,791,271 | B2 * | 9/2010 | Cok et al. | 313/506 |
| 2002/0196385 | A1 * | 12/2002 | He et al. | 349/61 |
| 2005/0140281 | A1 * | 6/2005 | Park | 313/505 |
| 2007/0070625 | A1 * | 3/2007 | Bang | 362/240 |
| 2009/0219462 | A1 * | 9/2009 | Kim | 349/64 |
| 2010/0214331 | A1 * | 8/2010 | Pyun et al. | 345/697 |

FOREIGN PATENT DOCUMENTS

KR   1020090015748   2/2009

* cited by examiner

*Primary Examiner* — Ashok Patel
(74) *Attorney, Agent, or Firm* — F. Chau & Associates, LLC

(57) ABSTRACT

In a backlight assembly, a light emitting module is divided into a plurality of light generating blocks each sequentially outputting a plurality of primary colors of light having different wavelengths. The light emitting module includes first and second base substrates, and a plurality of electroluminescent units disposed between the first and second base substrates and arranged in each of the light generating blocks. The light emitting module includes a barrier arranged corresponding to a boundary between two adjacent light generating blocks between the first and second base substrates to prevent the primary colors of light from traveling an adjacent light generating block. Thus, a mixture of colored light from the light generating blocks is prevented, thereby improving color reproducibility of the display apparatus.

19 Claims, 13 Drawing Sheets

BACKLIGHT ASSEMBLY AND DISPLAY APPARATUS HAVING THE SAME

CROSS-REFERENCE TO RELATED APPLICATION

This application claims priority to Korean Patent Application No. 2010-45085 filed on May 13, 2010, the contents of which are herein incorporated by reference in their entirety.

BACKGROUND

1. Technical Field

The present invention relates to a backlight assembly and a display apparatus having the backlight assembly. More particularly, the present invention relates to a backlight assembly capable of sequentially outputting a plurality of primary colors of light and a display apparatus having the backlight assembly.

2. Discussion of the Related Art

In general, a conventional backlight assembly employs a white light source, such as a cold cathode fluorescent lamp or a white light emitting diode, as a line light source, or the conventional backlight assembly simultaneously operates primary color light sources of red, green, and blue colors to use the primary color light sources as the white light source. In a liquid crystal display that uses the backlight assembly employing the white light source as a surface light source, pixels are provided with color filters to separate the white light into the red, green, and blue colors of light, so that each pixel transmits only one color light. However, since the amount of white light provided to the liquid crystal display panel from the backlight assembly is larger than the amount of the primary colors of light actually transmitted through the liquid crystal display panel, power consumption in the backlight assembly is inefficient.

A lot of research has been carried out to employ a device that sequentially outputs the primary colors of light, such as the red, green, and blue colors of light, using a light emitting diode or a field emission type light source which emits the primary colors of light as the backlight assembly.

SUMMARY

Exemplary embodiments of the present invention provide a backlight assembly capable of preventing a mixture of light colors when a plurality of primary colors of light is output from the backlight assembly, and a display apparatus having the backlight assembly.

According to an exemplary embodiment, a backlight assembly includes a plurality of light generating blocks each sequentially outputting a plurality of primary colors of light having different wavelengths.

The backlight assembly includes a first base substrate, a second base substrate facing the first base substrate, a plurality of electroluminescent units disposed between the first base substrate and the second base substrate and arranged in each of the light generating blocks, and a barrier disposed between the first base substrate and the second base substrate and positioned at a boundary between two adjacent light generating blocks to prevent the primary colors of light output from each of the light generating blocks from traveling to an adjacent light generating block.

According to an exemplary embodiment, a backlight assembly includes a light emitting module having a plurality of light generating blocks each of which sequentially outputs a plurality of primary colors of light having different wavelengths, a diffusion plate spaced apart from the light emitting module at a predetermined distance to face the light emitting module and diffusing the primary color lights sequentially output from the light emitting module, and at least one first barrier arranged between the light emitting module and the diffusion plate at a boundary between two adjacent light generating blocks to prevent the primary colors of light output from each light generating block from traveling to an adjacent light generating block.

The light emitting module includes a first base substrate, a second base substrate facing the first base substrate, a plurality of electroluminescent units disposed between the first base substrate and the second base substrate and arranged in each of the light generating blocks, and at least one second barrier arranged between the first base substrate and the second base substrate corresponding to the boundary between the two adjacent light generating blocks to prevent the primary colors of light output from each of the light generating blocks from traveling to an adjacent light generating block.

According to an exemplary embodiment, a display apparatus includes a backlight assembly sequentially outputting a plurality of primary colors of light having different wavelengths and a display panel disposed above the backlight assembly and including pixels that control a transmittance of the primary colors of light sequentially provided to display an image.

The backlight assembly includes a light emitting module, a diffusion plate, and at least one first barrier.

The light emitting module includes a plurality of light generating blocks each of which sequentially outputs the primary colors of light having the different wavelengths. The diffusion plate is spaced apart from the light emitting module at a predetermined distance to face the light emitting module and diffuses the primary colors of light sequentially output from the light emitting module. The at least one first barrier is arranged between the light emitting module and the diffusion plate at a boundary of two adjacent light generating blocks to prevent the primary colors of light output from each light generating block from traveling to an adjacent light generating block According to the exemplary embodiments, the first barrier is formed between the diffusion plate and the light emitting module corresponding to the boundary between two adjacent light generating blocks. Thus, light output from each of the light generating blocks may be prevented from traveling to the adjacent light generating block. Thus, a color mixture between the light generating blocks may be prevented, thereby improving color reproducibility of the display apparatus.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout the drawings and the specification.

Figure 1:
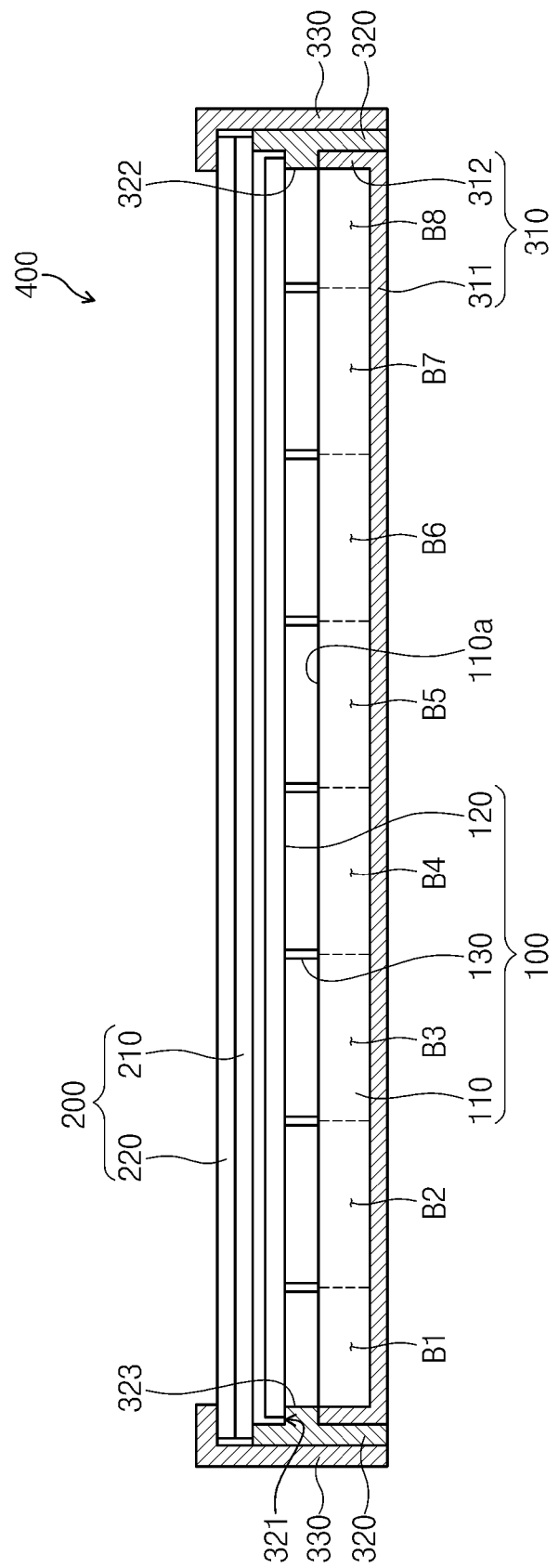
FIG. 1 is a cross-sectional view showing a display apparatus according to an exemplary embodiment of the present invention.
Figure 2:
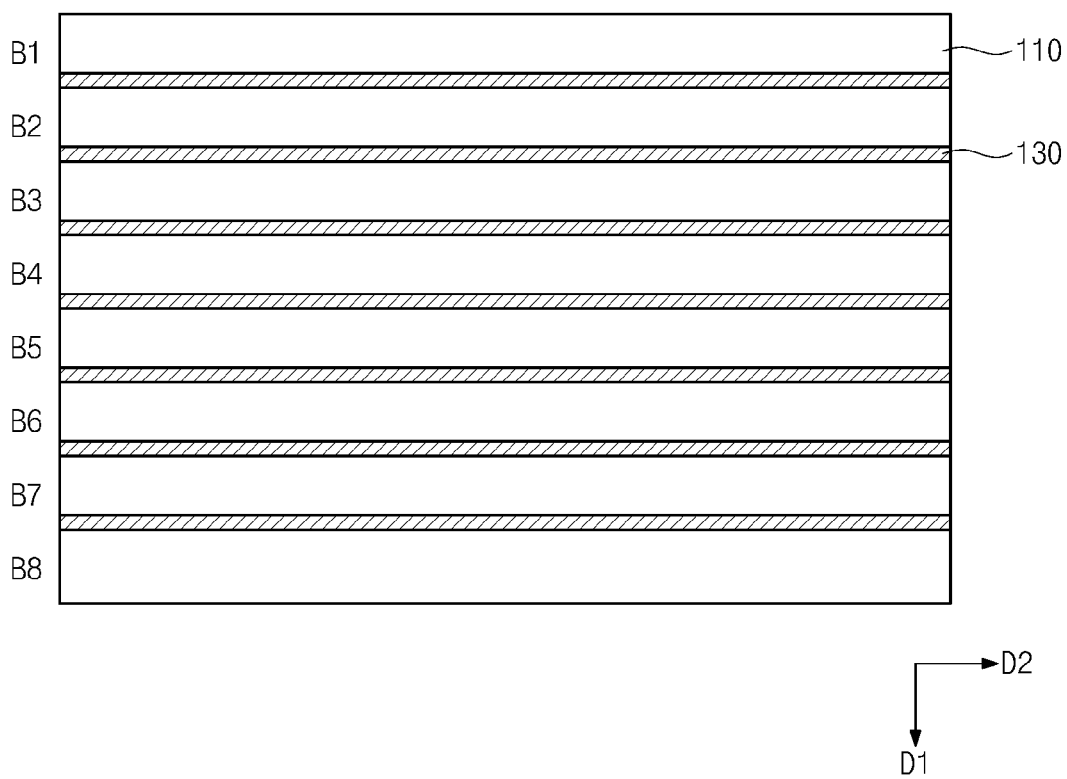
FIG. 2 is a plan view showing the electroluminescent module and first barriers of FIG. 1.

FIG. 1 is a cross-sectional view showing a display apparatus according to an exemplary embodiment of the present invention, and FIG. 2 is a plan view showing the electroluminescent module and first barriers of FIG. 1.

Referring to FIG. 1, a display apparatus 400 includes a backlight assembly 100 generating light and a display panel 200 receiving the light to display an image.

The backlight assembly 100 includes an electroluminescent module 110 emitting light through an exit surface 110a thereof, a diffusion plate 120 spaced apart from the exit surface 110a of the electroluminescent module 110 at a predetermined distance to face the exit surface 110a, and a plurality of first barriers 130 disposed between the diffusion plate 120 and the exit surface 110a.

A structure of the electroluminescent module 110 will be described in detail with reference to FIGS. 5 and 6.

As shown in FIG. 2, the electroluminescent module 110 includes first to eighth light generating blocks B1, B2, B3, B4, B5, B6, B7, and B8 that are divided along a first direction D1 in a plan view. The number of the light generating blocks B1, B2, B3, B4, B5, B6, B7, and B8 is not limited to eight. According to an embodiment, the light generating blocks B1, B2, B3, B4, B5, B6, B7, and B8 may be substantially simultaneously turned on or may be turned on in different periods from each other. According to an exemplary embodiment, the light generating blocks B1, B2, B3, B4, B5, B6, B7, and B8 are sequentially turned on in the first direction D1.

Each of the light generating blocks B1, B2, B3, B4, B5, B6, B7, and B8 sequentially outputs at least three types of light having different wavelengths during its turn-on period. As an example, the at least three types of light may include red light having a red wavelength, blue light having a blue wavelength, and green light having a green wavelength.

Each of the first barriers 130 is arranged at a boundary between two adjacent light generating blocks among the light generating blocks B1, B2, B3, B4, B5, B6, B7, and B8 and is extended in a second direction D2 that is substantially perpendicular to the first direction D1. Thus, each of the first barriers 130 may prevent mixture of light emitted from the two adjacent light generating blocks.

As an example, each of the first barriers 130 has a height that is the same as a distance between the exit surface 110a of the electroluminescent module 110 and the diffusion plate 120. According to an embodiment, each of the first barriers 130 may be a white reflective sheet. Therefore, among light emitted from the light generating blocks B1, B2, B3, B4, B5, B6, B7, and B8, light traveling in directions inclined by more than a predetermined angle with respect to a direction perpendicular to the exit surface 110a may be reflected by a corresponding first barrier among the first barriers 130. The predetermined angle may differ according to a height of each of the first barriers 130. As a consequence, each of the first barriers 130 may prevent the red light, the green light, and the blue light, which are sequentially output from each of the light generating blocks B1, B2, B3, B4, B5, B6, B7, and B8, from traveling to an adjacent light generating block, thereby preventing the mixture of light emitted from the light generating blocks B1, B2, B3, B4, B5, B6, B7, and B8.

The diffusion plate 120 diffuses the red light, the green light, and the blue light that are sequentially output from the electroluminescent module 110. Thus, the diffusion plate 120 may improve brightness uniformity of the backlight assembly 100.

The display apparatus 400 further includes a container 310 to contain the electroluminescent module 110 therein and a supporting frame 320 combined with the container 310 to support an edge portion of the diffusion plate 120.

The container 310 includes a bottom surface 311 and a side wall 312 extended from the bottom surface 311, and the electroluminescent module 110 is contained in a containing space defined by the bottom surface 311 and the side wall 312. According to an exemplary embodiment, the container 310 may be formed of a metal material.

Figure 3:
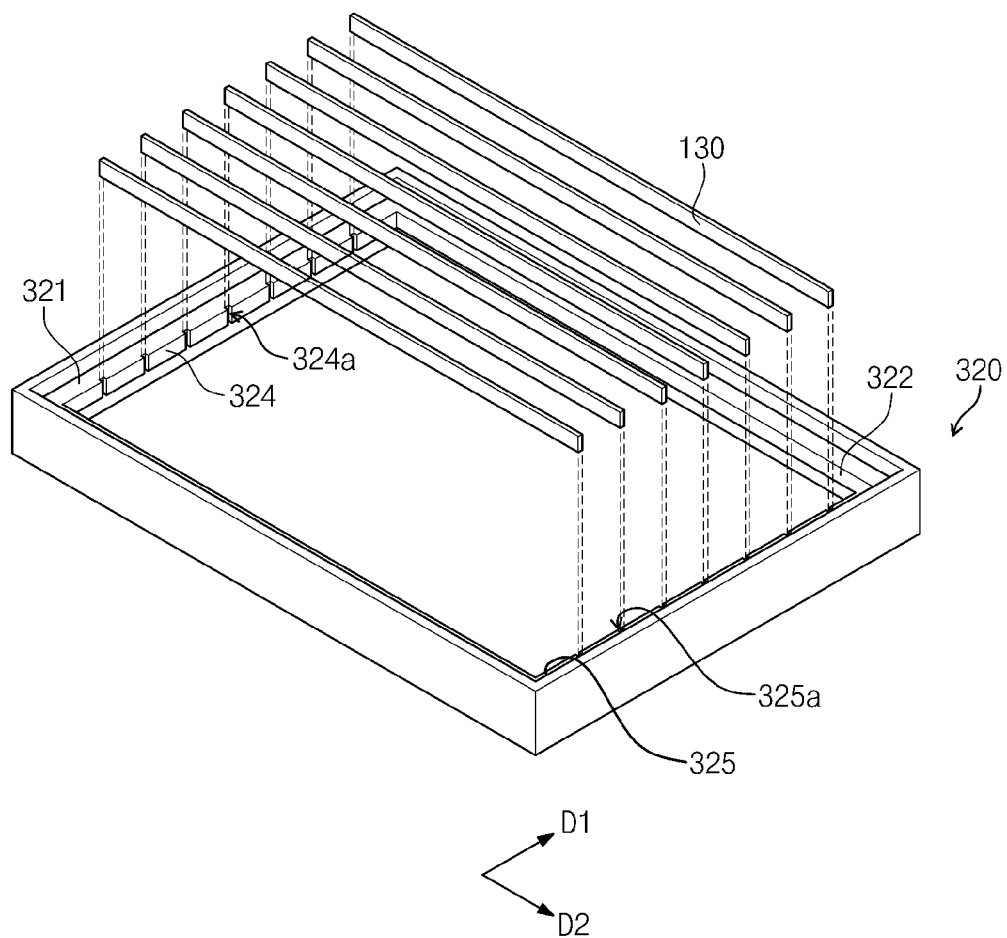
FIG. 3 is a perspective view showing the supporting frame and first barriers of FIG. 1.

FIG. 3 is a perspective view showing the supporting frame and the first barriers of FIG. 1.

Referring to FIGS. 1 and 3, the supporting frame 320 has a square frame shape and is combined with the container 310. Also, the diffusion plate 120 is seated in the supporting frame 320, and the supporting frame 320 is provided with a protruding step 321 formed to guide a side surface of the diffusion plate 120.

In addition, the supporting frame 320 includes a first inside wall 322, a second inside wall 323, a third inside wall 324, and a fourth inside wall 325, and the first to fourth inside walls 322, 323, 324, and 325 enclose a space between the diffusion plate 120 and the electroluminescent module 110 to prevent light emitted from the electroluminescent module 110 from traveling outside of the diffusion plate 120. Since the supporting frame 320 includes a white reflective molding material, the supporting frame 320 may reflect light incident to the first to fourth inside walls 322, 323, 324, and 325, thereby preventing light leakage of the backlight assembly 100. According to an embodiment, a reflective sheet may be coated on the first to fourth inside walls 322, 323, 324, and 325 to prevent the light leakage.

Among the first to fourth inside walls 322, 323, 324, and 325, the first and second inside walls 322 and 323 are extended in the second direction D2 and are arranged in parallel with the first barriers 130. The third and fourth inside walls 324 and 325 are extended in the first direction D1 and are connected to the first and second inside walls 322 and 323.

A plurality of first recesses 324a are formed through the third inside wall 324 with a uniform interval, and a plurality of second recesses 325a are formed through the fourth inside wall 325 with a uniform interval. First ends of the first barriers 130 are inserted into the first recesses 324a, respectively, and second ends of the first barriers 130 are inserted into the second recesses 325a, respectively.

Due to the insertion of both ends of the first barriers 130 into the first and second recesses 324a and 325a, the first barriers 130 may be combined with the supporting frame 320. When the first barriers 130 are fixed to the supporting frame 320, the first barriers 130 may be arranged at predetermined positions between the diffusion plate 120 and the electroluminescent module 110, for example, the boundary between the light generating blocks B1, B2, B3, B4, B5, B6, B7, and B8.

In the present exemplary embodiment, the first and second recesses 324a and 325a are formed through the third and fourth inside walls 324 and 325 of the supporting frame 320, however, the method of fixing the first barriers 130 to the supporting frame 320 is not limited to the above-described structure.

In case that the first barriers 130 have a reflectivity different from that of the supporting frame 320, a brightness difference occurs between the first light generating block B1 and the second to seventh light generating blocks B2, B3, B4, B5, B6, and B7 and between the eighth light generating block B8 and the second to seventh light generating blocks B2, B3, B4, B5, B6, and B7. Thus, the first barriers 130 may include a material that has the same reflectivity as that of the supporting frame 320.

In addition, in case that the reflective sheet is coated on the first and second inside walls 322 and 323 of the supporting frame 320, the first barriers 130 may include a material that has the same reflectivity as that of the reflective sheet.

Referring again to FIG. 1, the display panel 200 is arranged to face the diffusion plate 120. The display panel 200 includes an array substrate 210, an opposite substrate 220 facing the array substrate 210, and a liquid crystal layer (not shown) disposed between the array substrate 210 and the opposite substrate 220. The display panel 200 receives the lights, exiting from the diffusion plate 120 through the array substrate 210. The liquid crystal layer controls transmittance of light provided thereto, and then, the light travels to the opposite substrate 220.

Since the display panel 200 sequentially receives the red light, the green light, and the blue light from the backlight assembly 100, the display panel 200 does not require a color pixel. The display panel 200 may display a desired color by controlling the transmittance of the red, green, and blue light that are sequentially provided from the backlight assembly 100.

The display apparatus 400 further includes a top chassis 330 that covers the edge portion, i.e., a non-effective display area, of the display panel 200 and is combined with the supporting frame 320 or the container 310.

Figure 4:
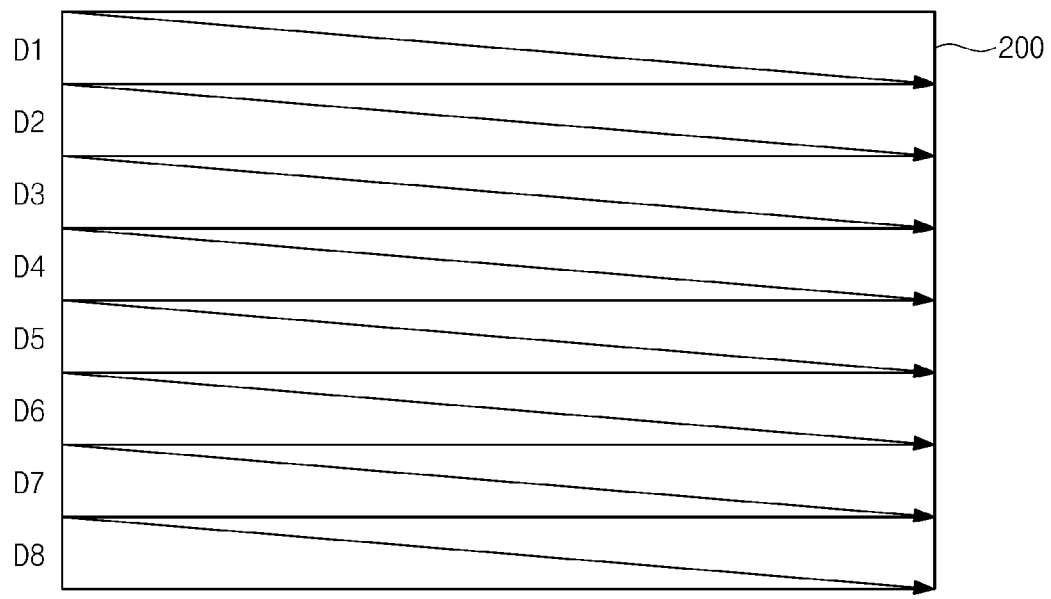
FIG. 4 is a plan view showing the display panel of FIG. 1.
Figure 5:
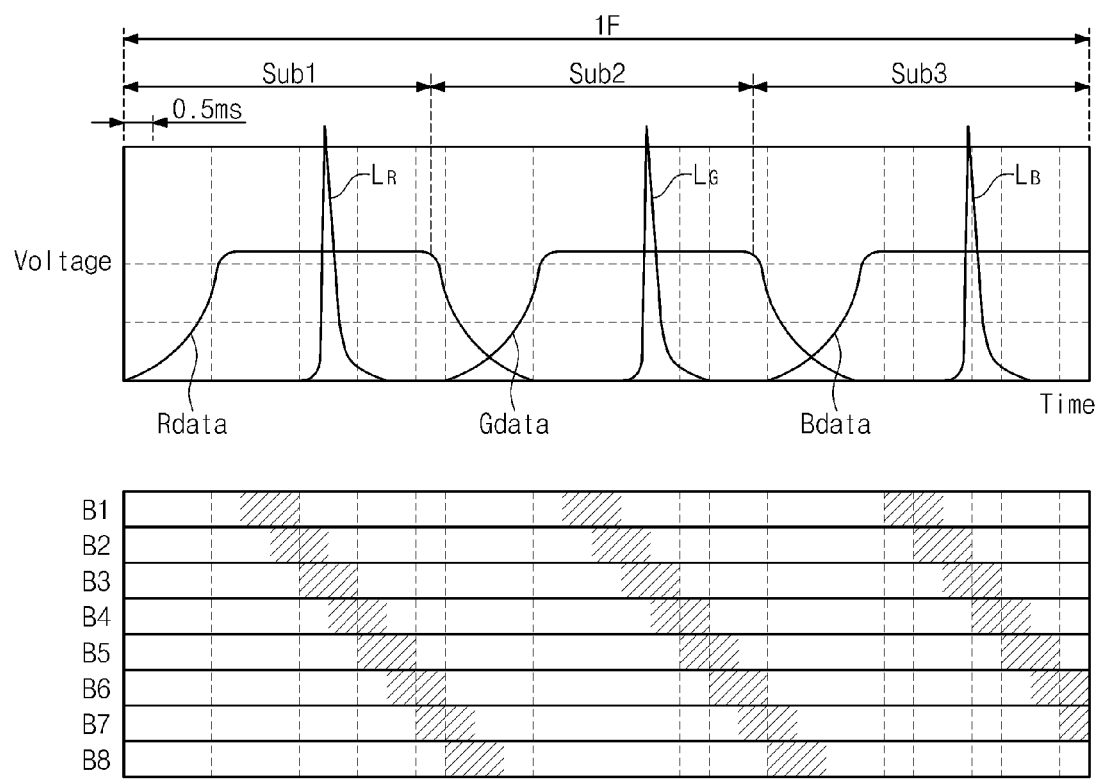
FIG. 5 is a timing diagram showing an operational flow of the display panel and the electroluminescent module of FIG. 4.

FIG. 4 is a plan view showing the display panel of FIG. 1, and FIG. 5 is a timing diagram showing an operational flow of the display panel and the electroluminescent module.

Referring to FIG. 4, the display panel 200 may be divided into a plurality of display areas D1, D2, D3, D4, D5, D6, D7, and D8, respectively, corresponding to the light generating blocks B1, B2, B3, B4, B5, B6, B7, and B8 of the backlight assembly 100. Each display area D1, D2, D3, D4, D5, D6, D7, and D8 includes a plurality of pixels (not shown).

A turn-on timing of each of the light generating blocks B1, B2, B3, B4, B5, B6, B7, and B8 is determined depending on a time at which the pixels arranged in a corresponding display area of the display areas D1, D2, D3, D4, D5, D6, D7, and D8 are charged.

As shown in FIG. 5, when a time period that is required to display one frame on the display panel 200 is defined as a frame period 1F, the frame period 1F is divided into a first period sub1, a second period sub2, and a third period sub3 which are consecutive. When the frame period 1F is about 16.7 ms, each of the first to third period may be set to about 5.56 ms.

A red data signal Rdata is charged to the display panel 200 in the first period sub1 among the frame period 1F. When the red data signal Rdata is sufficiently charged to a first display area D1 among the display areas D1, D2, D3, D4, D5, D6, D7, and D8, the first light generating block B1 outputs the red light $L_R$. Also, when the red data signal Rdata is sufficiently charged to a second display area D2, the second light generating block B2 outputs the red light $L_R$. Similar to this, the remaining light generating blocks B3, B4, B5, B6, B7, and B8 sequentially output the red light $L_R$.

Then, a green data signal Gdata is charged to the display panel 200 in the second period sub2 among the frame period 1F. When the green data signal Gdata is sufficiently charged to the first display area D1, the first light generating block B1 outputs the green light $L_G$. Also, when the green data signal Gdata is sufficiently charged to the second display area D2, the second light generating block B2 outputs the green light $L_G$. The remaining light generating blocks B3, B4, B5, B6, B7, and B8 sequentially output the green light $L_G$ through the above-mentioned procedure.

Also, a blue data signal Bdata is charged to the display panel 200 in the third period sub3 among the frame period 1F. When the blue data signal Bdata is sufficiently charged to the first display area D1, the first light generating block B1 outputs the blue light $L_B$. When the blue data signal Bdata is sufficiently charged to the second display area D2, the second light generating block B2 outputs the blue light $L_B$. The remaining light generating blocks B3, B4, B5, B6, B7, and B8 sequentially output the blue light $L_B$ through the above-described procedure.

According to an exemplary embodiment, a turn-on period of each light generating block B1, B2, B3, B4, B5, B6, B7, and B8 may be set to about 1ms in each period sub1, sub2, and sub3. Since the electroluminescent module 110 may generate light having a desired brightness in a short period of time, the electroluminescent module 110 has a relatively short flashing time compared with other light sources. Thus, when the light generating blocks B1, B2, B3, B4, B5, B6, B7, and B8 are sequentially flashed, light generated from the eighth light generating block B8 and light generated from the first light generating block B1 may be prevented from being mixed with each other.

Figure 6:
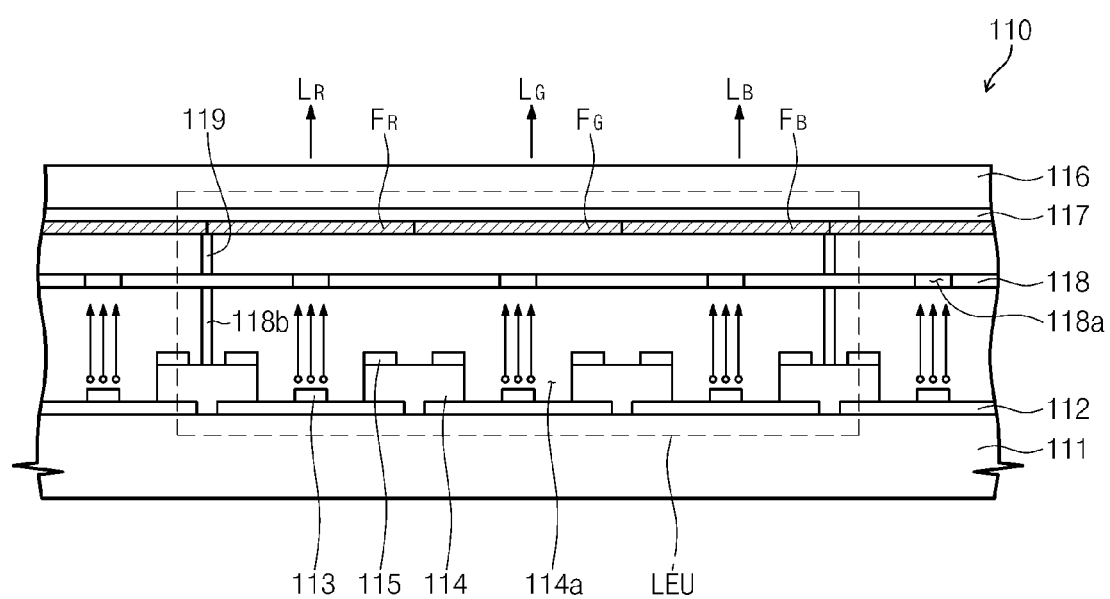
FIG. 6 is a cross-sectional view showing the electroluminescent module of FIG. 1.

FIG. 6 is a cross-sectional view showing the electroluminescent module of FIG. 1.

Referring to FIG. 6, the electroluminescent module 110 includes a first base substrate 111, a second base substrate 116 facing the first base substrate 111, and a plurality of light emitting units LEU arranged between the first base substrate 111 and the second base substrate 116. Although not shown in FIG. 6, each of the light generating blocks B1, B2, B3, B4, B5, B6, B7, and B8 of the electroluminescent module 110 may include at least one light emitting unit LEU.

The first and second base substrates 111 and 116 may be formed of a transparent and insulative material such as a glass.

Each of the light emitting units LEU includes a cathode electrode 112, an electric field emitter 113, an insulating layer 114, a gate electrode 115, an anode electrode 117, a red fluorescent layer $F_R$, a green fluorescent layer $F_G$, and a blue fluorescent layer $F_B$.

The cathode electrode 112 is arranged on the first base substrate 111. The cathode electrode 112 may be formed in a single-layered structure or a multi-layered structure and may include a metal material having a conductivity. In addition, the cathode electrode 112 may be separately formed to have plural electrodes that respectively correspond to the red fluorescent layer $F_R$, the green fluorescent layer $F_G$, and the blue fluorescent layer $F_B$.

The electric field emitter 113 and the insulating layer 114 are arranged on the cathode electrode 112. The insulating layer 114 may include an silicon oxide layer, a silicon nitride layer, or an organic layer, and an opening 114a is formed through the insulating layer 114 to expose the electric field emitter 113. The electric field emitter 113 includes a carbon nanotube to emit electrons. The carbon nanotube may be grown from a surface of the cathode electrode 112, or a carbon nanotube emitter tip may be formed on the cathode electrode 112 using a polymer paste with which the carbon nanotube is mixed.

The gate electrode 115 is arranged on the insulating layer 114 and positioned above the electric field emitter 113. When a voltage is applied to the cathode electrode 112 and the gate electrode 115, the electric field emitter 113 emits the electrons by a voltage difference between the cathode electrode 112 and the gate electrode 115. As an example, negative and positive voltages may be applied to the cathode electrode 112 and the gate electrode 115, respectively.

In addition, the gate electrode 115 may receive a voltage having a specific frequency. The frequency of the voltage applied to the gate electrode 115 may the same as a driving frequency of the display panel 200 or an integer multiple of the driving frequency of the display panel 200. For example, when the driving frequency of the display panel 200 is 60 Hz or 120 Hz, the frequency of the voltage applied to the gate electrode 115 may be 60 Hz, 120 Hz, or an integer multiple of 60 Hz or 120 Hz.

The anode electrode 117 is arranged on the second base substrate 116 to face the cathode electrode 112. The anode electrode 117 may include a transparent conductive material, such as an indium tin oxide ITO or an indium zinc oxide IZO, to accelerate the electrons emitted from the electric field emitter 113. In case that the negative voltage is applied to the cathode electrode 112 and the positive voltage is applied to the anode electrode 117, the electrons emitted from the electric field emitter 113 are accelerated toward the anode electrode 117 by a voltage difference between the cathode electrode 112 and the anode electrode 117 to generate an electron beam.

As shown in FIG. 6, the anode electrode 117 is arranged on the second base substrate 116. According to an embodiment, however, the electroluminescent module 110 may include an electrode substrate where the anode electrode 117 and the second base substrate 116 are integrally formed with each other. According to an embodiment, the electrode substrate may be formed of ITO or IZO.

The red, green, and blue fluorescent layers $F_R$, $F_G$, and $F_B$ are formed on a surface of the anode electrode 117 facing the cathode electrode 112. Each of the red, green, and blue fluorescent layers $F_R$, $F_G$, and $F_B$ is arranged on different areas of the anode electrode 117.

Thus, the red fluorescent layer $F_R$ collides with the electron beam that is accelerated to the anode electrode 117 to output red light $L_R$ having a red wavelength. The green fluorescent layer $F_G$ collides with the electron beam that is accelerated to the anode electrode 117 to output green light $L_G$ having a green wavelength, and the blue fluorescent layer $F_B$ collides with the electron beam that is accelerated to the anode electrode 117 to output blue light $L_B$ having a blue wavelength.

Each of the light emitting units LEU sequentially outputs the red light $L_R$, the green light $L_G$, and the blue light $L_B$ during a predetermined time period. As shown in FIG. 5, among the first period sub1, the second period sub2, and the third period sub3 which are consecutive, each of the light emitting units LEU outputs the red light $L_R$ during the first period sub1, each of the light emitting units LEU outputs the green light $L_G$ during the second period sub2, and each of the light emitting units LEU outputs the blue light $L_B$ during the third period sub3.

Each of the light emitting units LEU further includes a reflective layer 118 that is disposed between the first base substrate 111 and the fluorescent layers $F_R$, $F_G$, and $F_B$ to reflect light emitted from the fluorescent layers $F_R$, $F_G$, and $F_B$. Most of the red light $L_R$, the green light $L_G$, and the blue light $L_B$, which are generated when the fluorescent layers $F_R$, $F_G$, and $F_B$ collide with the electron beam, exit to an exterior through the second base substrate 116, however, some of the red light $L_R$, the green light $L_G$, and the blue light $L_B$ may exit to the first base substrate 111. The reflective layer 118 reflects some of the light exiting to the first base substrate 111 to increase the amount of light exiting to the second base substrate 117. The reflective layer 118 may be formed of aluminum.

The reflective layer 118 includes an opening 118a that is formed corresponding to the electric field emitter 113 to provide the electron beam emitted from the electric field emitter 113 to the fluorescent layers $F_R$, $F_G$, and $F_B$.

To maintain a space between the reflective layer 118 and the first base substrate 111, the light emitting unit LEU further includes a spacer 118b arranged on the insulating layer 114 to support the reflective layer 118. The spacer 118b provides a space where the electrons are accelerated between the first base substrate 111 and the second base substrate 116. Also, the reflective layer 118 may be arranged closer to the second base substrate 116 than the first base substrate 111 by controlling a height of the spacer 118b.

Each of the light emitting units LEU further includes a plurality of second barriers 119 disposed between the reflective layer 118 and the fluorescent layers $F_R$, $F_G$, and $F_B$. Each of the second barriers 119 is formed corresponding to a boundary between two adjacent light generating blocks among the light generating blocks B1, B2, B3, B4, B5, B6, B7, and B8 and overlaps two fluorescent layers positioned at the boundary between the two adjacent light generating blocks among the light generating blocks B1, B2, B3, B4, B5, B6, B7, and B8. Each of the second barriers 119 has a height that is the same as a distance between the reflective layer 118 and the fluorescent layers $F_R$, $F_G$, and $F_B$ and is protruded toward the first base substrate 111. In addition, each of the second barriers 119 may include a white dielectric material having a high reflectivity. Therefore, the second barriers 119 prevent the light output from each of the light generating blocks B1, B2, B3, B4, B5, B6, B7, and B8 from traveling to an adjacent light generating block among the light generating blocks B1, B2, B3, B4, B5, B6, B7, and B8.

Figure 7:
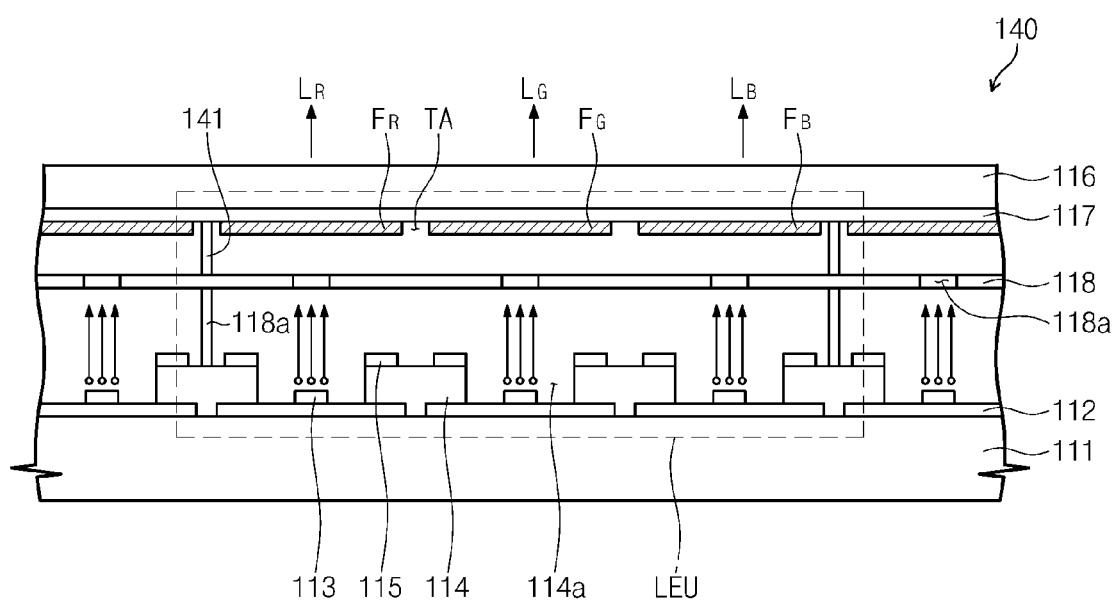
FIG. 7 is a cross-sectional view showing an electroluminescent module according to an exemplary embodiment of the present invention.

FIG. 7 is a cross-sectional view showing an electroluminescent module according to an exemplary embodiment of the present invention. In FIG. 7, the same reference numerals denote the same or similar elements as in the exemplary embodiment described in connection with FIG. 6.

Referring to FIG. 7, in an electroluminescent module 140, two fluorescent layers adjacent to each other may be spaced apart from each other at a predetermined distance. Each of red, green, and blue fluorescent layer $F_R$, $F_G$, and $F_B$ may be spaced apart from an adjacent fluorescent layer to have an island shape. When a space TA is formed at a boundary between the fluorescent layers $F_R$, $F_G$, and $F_B$, light beams emitted from the fluorescent layers $F_R$, $F_G$, and $F_B$ may be prevented from being mixed with each other.

In addition, each light emitting unit LEU includes second barriers 141 arranged between two fluorescent layers. The second barriers 141 are arranged between the reflective layer 118 and the fluorescent layers $F_R$, $F_G$, and $F_B$ and have a white dielectric material having a high reflectivity. Thus, the second barriers 141 may prevent light emitted from the light generating blocks B1, B2, B3, B4, B5, B6, B7, and B8 from traveling to an adjacent light generating block.

Figure 8:
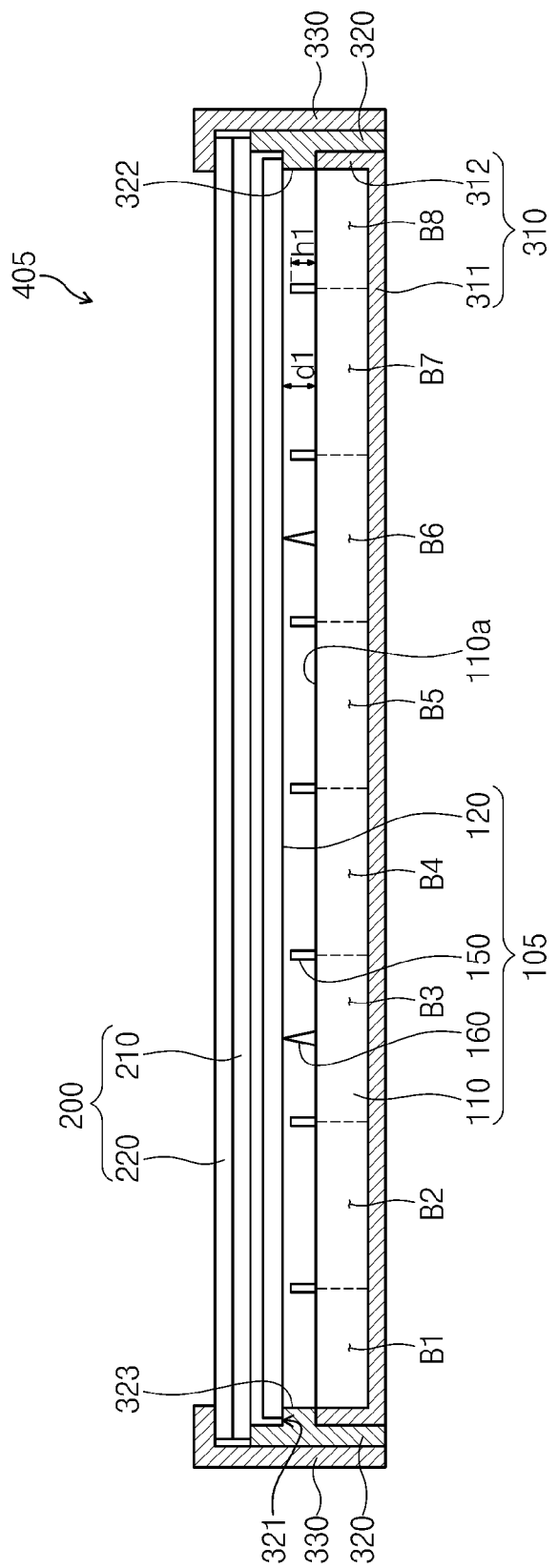
FIG. 8 is a cross-sectional view showing a display apparatus according to an exemplary embodiment of the present invention.
Figure 9:
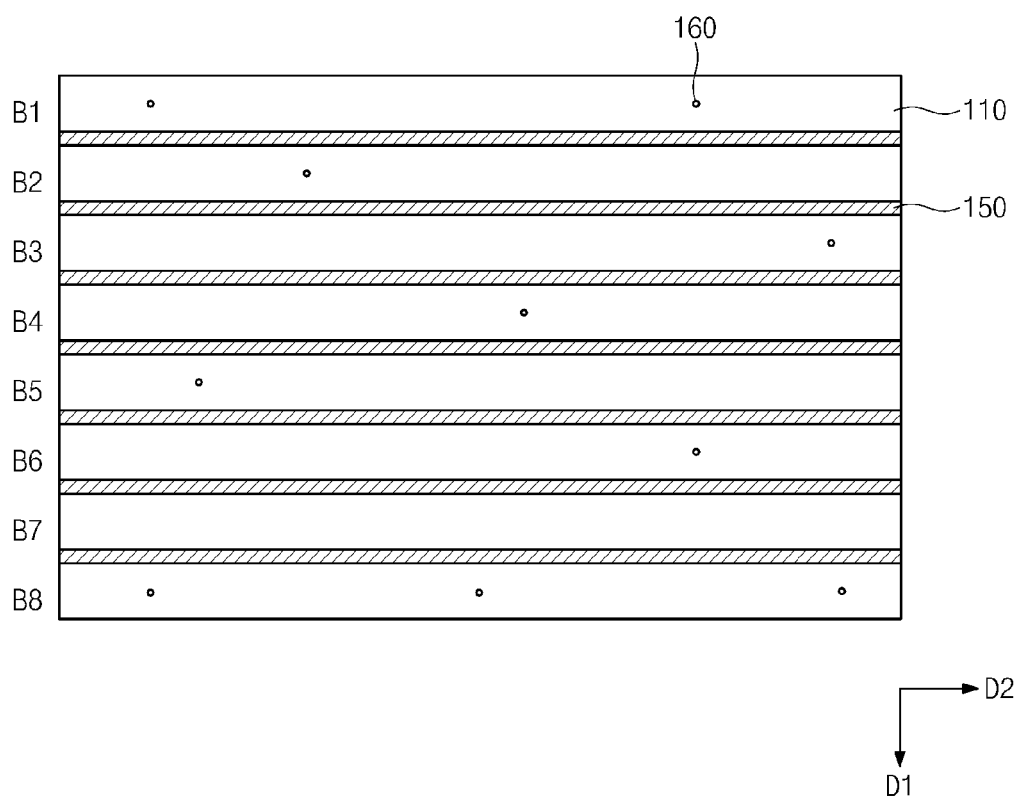
FIG. 9 is a plan view showing the electroluminescent module, first barriers, and supporters of FIG. 8.

FIG. 8 is a cross-sectional view showing a display apparatus according to an exemplary embodiment of the present invention, and FIG. 9 is a plan view showing the electroluminescent module, first barriers, and supporters of FIG. 8. In FIG. 8, the same reference numerals denote the same or similar elements as in the exemplary embodiment described in FIG. 1.

Referring to FIG. 8, a display apparatus 405 includes a backlight assembly 105 generating light and a display panel 200 receiving the light to display an image.

The backlight assembly 105 includes an electroluminescent module 110 emitting the light through an exit surface thereof 110a, a diffusion plate 120 spaced apart from the exit surface 110a of the electroluminescent module at a predetermined distance to face the exit surface 110a, and a plurality of first barriers 150 disposed between the diffusion plate 120 and the exit surface 110a.

As shown in FIG. 9, the electroluminescent module 110 includes first to eighth light generating blocks B1, B2, B3, B4, B5, B6, B7, and B8 that are divided along a first direction D1 in a plan view. The number of the light generating blocks B1, B2, B3, B4, B5, B6, B7, and B8 is not limited to eight.

Each of the first barriers 150 is arranged at a position corresponding to a boundary between two adjacent light generating blocks of the light generating blocks B1, B2, B3, B4, B5, B6, B7, and B8 and is extended in a second direction D2 that is substantially perpendicular to the first direction D1. Thus, each of the first barriers 150 may prevent light beams emitted from the two adjacent light generating blocks among the light generating blocks B1, B2, B3, B4, B5, B6, B7, and B8 from being mixed with each other.

Each of the first barriers 150 has a height h1 that is lower than a distance d1 between the electroluminescent module 110 and the diffusion plate 120. According to an exemplary embodiment, each of the first barriers 150 has the height h1 that is from about 50% to about 70% of the distance d1.

The backlight assembly 105 further includes a supporter 160 disposed between the diffusion plate 120 and the electroluminescent module 110 to support the diffusion plate 120. The supporter 160 has the same height as the distance d1 between the diffusion plate 120 and the electroluminescent module 110. Therefore, the supporter 160 may prevent the diffusion plate 120 from being bent.

The supporter 160 has a cone shape and is arranged between two adjacent first barriers 150. The supporter 160 may have a transparent material or a white color material.

Figure 10:
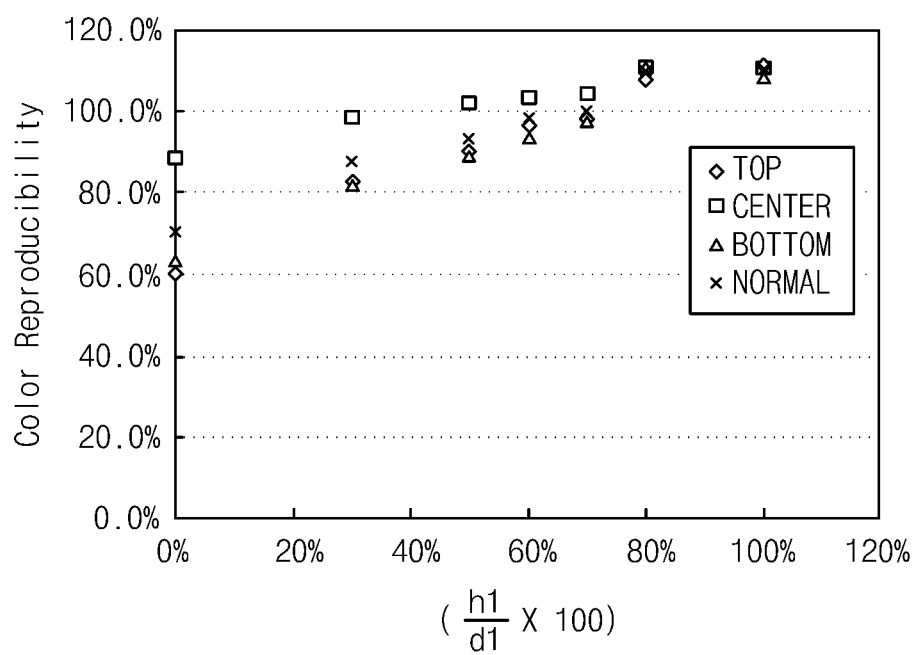
FIG. 10 is a graph showing color reproducibility depending on heights of the first barriers of FIG. 8.
Figure 11:
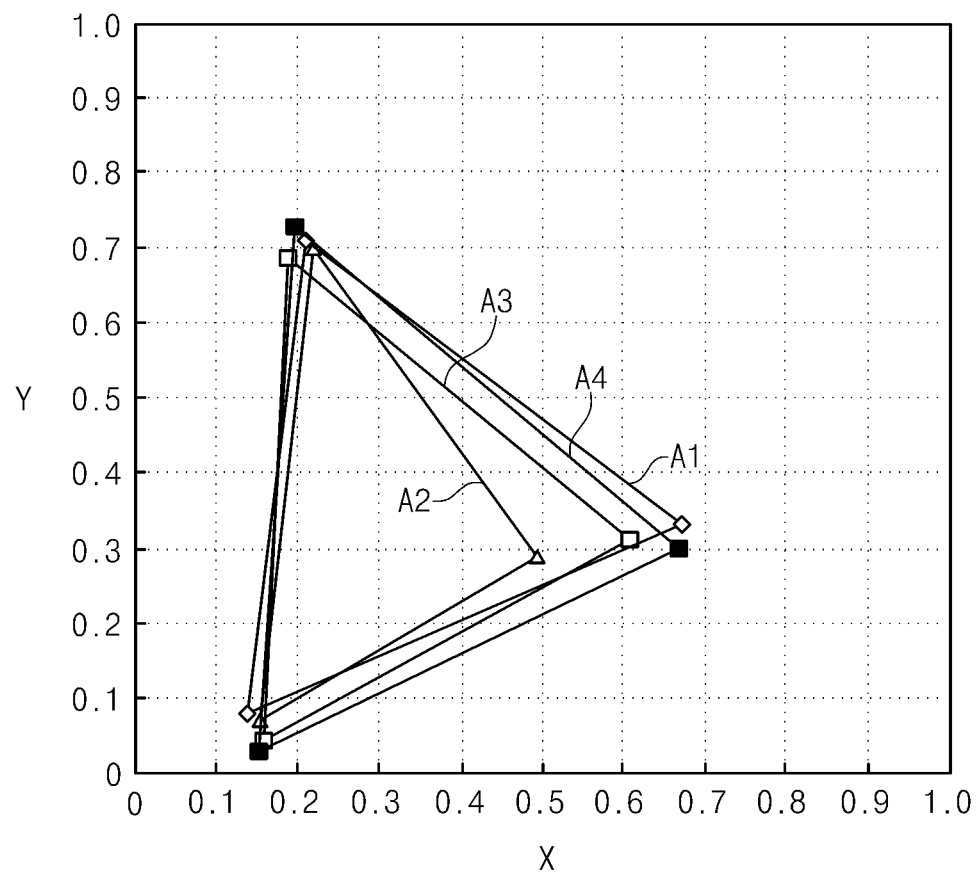
FIG. 11 is a graph showing a color coordinate depending on heights of the first barriers.

FIG. 10 is a graph showing color reproducibility depending on heights of the first barriers of FIG. 8. FIG. 11 is a graph showing a color coordinate depending on heights of the first barriers. In FIG. 10, an x-axis represents a ratio, expressed as a percentage, of the distance d1 between the diffusion plate 120 and the exit surface 110a with respect to the height h1 of the first barriers 150, and a y-axis represents color reproducibility of the display apparatus 405.

In FIG. 10, color reproducibility (NORMAL) measured when the first barriers 150 are not arranged between the diffusion plate 120 and the electroluminescent module 110 has been shown. Color reproducibility of a center portion (CENTER) of the display area of the display apparatus 405, and color reproducibility of both end portions (e.g., an upper portion TOP and a lower portion BOTTOM) of the display area of the display apparatus 405 in the first direction D1 have been shown, which are measured when the first barriers 150 are arranged between the diffusion plate 120 and the electroluminescent module 110.

In case that the first barriers 150 are arranged between the diffusion plate 120 and the electroluminescent module 110, the color reproducibility is relatively higher over the whole area of the display apparatus 405 when compared to the color reproducibility NORMAL measured when the first barriers 150 are not arranged between the diffusion plate 120 and the electroluminescent module 110. As a consequence, the color reproducibility of the display apparatus 405 may be improved by disposing the first barriers 150 between the diffusion plate 120 and the electroluminescent module 110.

As the height h1 of the first barriers 150 increases, the color reproducibility is improved in the center portion CENTER of the display area of the display apparatus 405. Similarly, as the height h1 of the first barriers 150 increases, the color reproducibility is improved in the upper portion TOP and the lower portion BOTTOM of the display area of the display apparatus 405.

As a result, as the height h1 of the first barriers 150 increases, the mixture of color light occurring between the light generating blocks B1, B2, B3, B4, B5, B6, B7, and B8 may be prevented, thereby improving the color reproducibility of the display apparatus 405.

Referring to FIG. 11, the color coordinate of the display apparatus 405 depending on the height h1 of the first barriers 150 has been illustrated as a CIE 1931 color space diagram.

In FIG. 11, a first graph A1 shows a standard color coordinate (hereinafter, referred to as sRGB), a second graph A2 shows a color coordinate when the first barriers 150 are not arranged between the diffusion plate 120 and the electroluminescent module 110, a third graph A3 shows a color coordinate when the first barriers 150 has a height h1 that is about 80% of the distance d1, and a fourth graph A4 shows a color coordinate when the first barriers 150 has a height that is about 100% of the distance d1.

As shown in the first to fourth graphs A1, A2, A3, and A4, the color coordinate of the display apparatus 405 is approximate to the standard color coordinate sRGB when the first barriers 150 are formed compared to when the first barriers 150 are not formed. As the height h1 of the first barriers 150 increases, the color coordinate of the display apparatus 405 is approximate to the standard color coordinate sRGB.

As a consequence, the color reproducibility of the display apparatus 405 may be improved by arranging the first barriers 150 between the diffusion plate 120 and the electroluminescent module 110.

However, when the height h1 of the first barriers 150 increases, the first barriers 150 may be perceived as a bright line or a dark line in the display apparatus 405. According to an embodiment, when the first barriers 150 are formed between the diffusion plate 120 and the electroluminescent module 110, the height of the first barriers 150 may be set to about 50% to about 70% of the distance d1 so that the first barriers 150 may be prevented from being perceived as the bright line or the dark line in the display apparatus 405.

As shown in FIG. 10, the color reproducibility of the center portion CENTER of the display area of the display apparatus 405 is relatively higher than the color reproducibility of the upper portion TOP or the lower portion BOTTOM of display area of the display apparatus 405. Therefore, the first barriers 150 arranged in an area corresponding to the upper portion TOP or the lower portion BOTTOM of the display area of the display apparatus 405 may have a height higher than the first barriers 150 arranged in an area corresponding to the center portion CENTER of the display area of the display apparatus 405.

Figure 12:
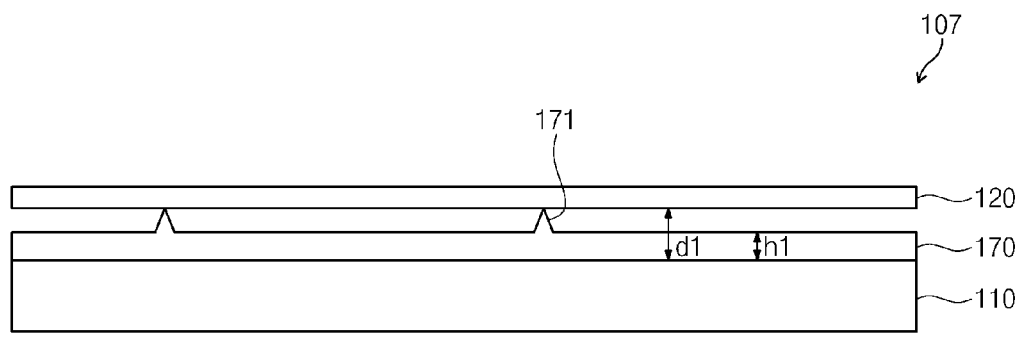
FIG. 12 is a cross-sectional view showing a backlight assembly according to an exemplary embodiment of the present invention.

FIG. 12 is a cross-sectional view showing a backlight assembly according to an exemplary embodiment of the present invention.

Referring to FIG. 12, a backlight assembly 107 includes first barriers 170 disposed between a diffusion plate 120 and an electroluminescent module 110.

The first barriers 170 are arranged in a stripe shape and has a height that is from about 50% to about 70% of a distance d1 between the diffusion plate 120 and the electroluminescent module 110.

The backlight assembly 107 further includes a plurality of supporters 171 arranged between the first barriers 170 and the diffusion plate 120 to support the diffusion plate 120. According to an exemplary embodiment, the supporters 171 may be extended from an upper portion of the first barriers 170 and integrally formed with the first barriers 170.

The supporters 171 have a triangular shape and are spaced apart from each other at a predetermined distance. Although not shown in FIG. 12, edge portions of the supporters 171, which make contact with the diffusion plate 120, may have a round shape, so that a surface of the diffusion plate 120 may be prevented from being scratched by the supporters 171.

Figure 13:
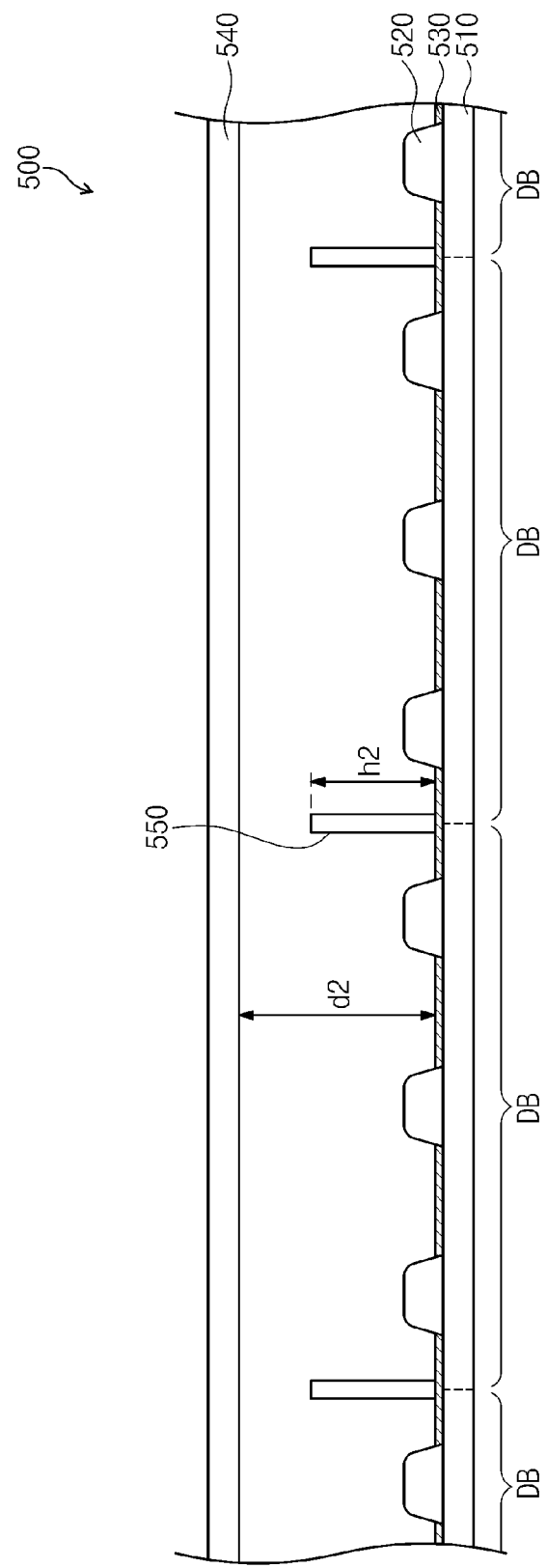
FIG. 13 is a cross-sectional view showing a backlight assembly according to an exemplary embodiment of the present invention.

FIG. 13 is a cross-sectional view showing a backlight assembly according to an exemplary embodiment of the present invention.

Referring to FIG. 13, a backlight assembly 500 includes a printed circuit board 510, a plurality of light sources 520 mounted on the printed circuit board 510 to emit light, and a diffusion plate 540 facing the printed circuit board 510 while being spaced apart from the printed circuit board at a predetermined distance to diffuse the light.

Each of the light sources 520 may include a red light emitting diode that emits red light, a green light emitting diode that emits green light, and a blue light emitting diode that emits blue light.

The printed circuit board 510 may be divided into a plurality of light generating blocks DB, and each light generating block DB may include at least one light source 520 among the light sources 520.

The printed circuit board 510 may include a reflective sheet 530 provided on its upper surface on which the light sources 520 are mounted. Openings may be formed through the reflective sheet 530 corresponding to areas where the light sources 520 are arranged. The reflective sheet 530 may reflect light emitted from the light sources 520, to thereby improve a light efficiency.

The backlight assembly 500 may include a plurality of third barriers 550 each of which is positioned at a position corresponding to a boundary between two adjacent light generating blocks DB. The third barriers 550 are arranged between the diffusion plate 540 and the reflective sheet 530.

According to an exemplary embodiment, the third barriers 550 may include the same material as the reflective sheet 530. Each of the third barriers 550 may have a height that is from about 50% to about 70% of a distance d2 between the diffusion plate 540 and the reflective sheet 530.

Accordingly, each of the third barriers 550 may prevent light beams emitted from the two adjacent light generating blocks DB from being mixed with each other.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising a plurality of light generating blocks each sequentially outputting light having a plurality of colors and having different wavelengths, the backlight assembly comprising:
   a first base substrate; a second base substrate facing the first base substrate;
   a plurality of electroluminescent units disposed between the first base substrate and the second base substrate and arranged in each of the light generating blocks; and
   a barrier disposed between the first base substrate and the second base substrate and positioned at a boundary between two adjacent light generating blocks, wherein each of the electroluminescent units comprises:
   a first electrode arranged on the first base substrate;
   a plurality of electric field emitters arranged on the first electrode to emit an electron beam;
   an insulating layer arranged on the first electrode and provided with a plurality of openings to expose the electric field emitters;
   a plurality of second electrodes arranged on the insulating layer to control an operation of the electric field emitters, respectively;
   a third electrode arranged on a surface of the second base substrate, the third electrode being spaced apart from the first electrode at a predetermined distance and facing the first electrode to accelerate the electron beam emitted from the electric field emitters;
   a plurality of fluorescent layers arranged on a surface of the third electrode to face the first electrode, the fluorescent layers colliding with the electron beam to output the light having the plurality of colors; and
   a reflective layer arranged between the fluorescent layers and the electric field emitters and provided with an opening that is formed corresponding to the electric field emitters to transmit the electron beam the reflective layer reflecting the light having the plurality off colors.

2. The backlight assembly of claim 1, wherein the fluorescent layers are spaced apart from each other at a predetermined distance, and the barrier is arranged between two adjacent fluorescent layers at the boundary of the two adjacent light generating blocks.

3. The backlight assembly of claim 1, wherein the barrier is disposed between the reflective layer and the fluorescent layers.

4. The backlight assembly of claim 1, wherein the barrier comprises a white dielectric material.

5. The backlight assembly of claim 1, wherein the barrier overlaps two adjacent fluorescent layers at the boundary between the two adjacent light generating blocks.

6. A backlight assembly comprising:
   a light emitting module including a plurality of light generating blocks each of which sequentially outputs light having a plurality of colors and having different wavelengths through an exit surface thereof;
   a diffusion plate spaced apart from the exit surface of the light emitting module at a predetermined distance to face the light emitting module, the diffusion plate diffusing the light having the plurality of colors; and at least one first barrier arranged between the exit surface of the light emitting module and the diffusion plate at a boundary between two adjacent light generating blocks, wherein the light emitting module comprises:

a first base substrate;

a second base substrate facing the first base substrate;

a plurality of electroluminescent units disposed between the first base substrate and the second base substrate and arranged in each of the light generating blocks; and at least one second barrier arranged between the first base substrate and the second base substrate corresponding to the boundary between the two adjacent light generating blocks.

7. The backlight assembly of claim 6, wherein the first barrier comprises a white reflective sheet and the second barrier comprises a white dielectric material.

8. The backlight assembly of claim 6, wherein each of the electroluminescent units comprises:

a first electrode arranged on the first base substrate;

a plurality of electric field emitters arranged on the first electrode to emit an electron beam;

an insulating layer arranged on the first electrode and provided with a plurality of openings that expose the electric field emitters;

a plurality of second electrodes arranged on the insulating layer to control an operation of the electric field emitters, respectively;

a third electrode arranged on a surface of the second base substrate, the third electrode being spaced apart from the first electrode at a predetermined distance and facing the first electrode to accelerate the electron beam emitted from the electric field emitters;

a plurality of fluorescent layers arranged on a surface of the third electrode to face the first electrode, the fluorescent layers colliding with the electron beam to output the light having the plurality of colors; and a reflective layer arranged between the fluorescent layers and the electric field emitters and provided with an opening that is formed corresponding to the electric field emitters to transmit the electron beam, the reflective layer reflecting the light having the plurality of colors.

9. The backlight assembly of claim 8, wherein the second barrier is disposed between the reflective layer and the fluorescent layers.

10. The backlight assembly of claim 8, wherein the fluorescent layers comprise:

a red fluorescent layer outputting first light having a red wavelength;

a green fluorescent layer outputting second light having a green wavelength; and a blue fluorescent layer outputting third light having a blue wavelength, wherein each light generating block sequentially outputs the first to third light during a predetermined time period.

11. The backlight assembly of claim 10, wherein, among a first period, a second period, and a third period that are consecutive, the light generating blocks are sequentially operated to output the first light during the first period, the light generating blocks are sequentially operated to output the second light during the second period, and the light generating blocks are sequentially operated to output the third light during the third period.

12. The backlight assembly of claim 6, wherein the first barrier has a height that corresponds to a range of about 50% to about 70% of a distance between the diffusion plate and the light emitting module.

13. The backlight assembly of claim 12, further comprising a supporter arranged between the diffusion plate and the light emitting module to support the diffusion plate.

14. The backlight assembly of claim 13, wherein the supporter is disposed between the first barrier and the diffusion plate, and the supporter is integrally formed with the first barrier.

15. The backlight assembly of claim 13, wherein the supporter is positioned between two adjacent first barriers and has a height the same as a distance between the diffusion plate and the light emitting module.

16. A display apparatus comprising:

a backlight assembly sequentially outputting light having a plurality of colors and having different wavelengths; and a display panel disposed above the backlight assembly and including pixels that control a transmittance of the light having the plurality of colors, wherein the backlight assembly comprises:

a light emitting module including a plurality of light generating blocks each of which sequentially outputs the light having the plurality of colors through an exit surface thereof;

a diffusion plate spaced apart from the exit surface of the light emitting module at a predetermined distance to face the light emitting module, the diffusion plate diffusing the light having the plurality of colors; and at least one first barrier arranged between the exit surface of the light emitting module and the diffusion plate at a boundary of two adjacent light generating blocks, and wherein the light emitting module comprises:

a first base substrate;

a second base substrate facing the first base substrate;

a plurality of electroluminescent units arranged in each of the light generating blocks and disposed between the first base substrate and the second base substrate; and at least one second barrier arranged between the first base substrate and the second base substrate corresponding to the boundary of the two adjacent light generating blocks.

17. The display apparatus of claim 16, further comprising:

a container containing the light emitting module; and a supporting frame that is combined with the container to support an outer portion of the diffusion plate, wherein the first barrier is formed of a material having a reflectivity the same as the supporting frame.

18. The display apparatus of claim 16, wherein each of the electroluminescent units comprises:

a first electrode arranged on the first base substrate;

a plurality of electric field emitters arranged on the first electrode to emit an electron beam;

an insulating layer arranged on the first electrode and provided with a plurality of openings that expose the electric field emitters;

a plurality of second electrodes arranged on the insulating layer to control an operation of the electric field emitters, respectively;

a third electrode arranged on a surface of the second base substrate, the third electrode being spaced apart from the first electrode at a predetermined distance and facing the first electrode to accelerate the electron beam;

a plurality of fluorescent layers arranged on a surface of the third electrode to face the first electrode, the fluorescent layers colliding with the electron beam to output the light having the plurality of colors; and a reflective layer arranged between the fluorescent layers and the electric field emitters and provided with an opening that is formed corresponding to the electric field emitters to transmit the electron beam, the reflective layer reflecting the light having the plurality of colors.

19. The display apparatus of claim 18, wherein the second barrier is disposed between the reflective layer and the fluorescent layers.

* * * * *